United States Patent [19]
Dalena et al.

[11] 3,789,403
[45] Jan. 29, 1974

[54] DIGITAL LINE GRAPHICS CONTROL ON RANGE SCALABLE RADAR CRT DISPLAY

[75] Inventors: Rudolph Dalena, Placentia; Roy K. Onishi, Anaheim, both of Calif.; Donald F. Walker, Boulder, Colo.

[73] Assignee: Hughes Aircraft Company, Culver City, Calif.

[22] Filed: July 24, 1972

[21] Appl. No.: 274,544

[52] U.S. Cl. .............................. 343/5 DP, 343/5 EM
[51] Int. Cl. ............................................... G01s 7/22
[58] Field of Search ........................ 343/5 DP, 5 EM

[56] References Cited
UNITED STATES PATENTS

| | | | |
|---|---|---|---|
| 3,134,974 | 5/1964 | Orenstein | 343/5 EM X |
| 3,270,337 | 8/1966 | Howard | 343/5 DP |
| 3,292,034 | 12/1966 | Braaten | 343/5 DP X |
| 3,717,872 | 2/1973 | Snook et al. | 343/5 EM |

*Primary Examiner*—T. H. Tubbesing
*Attorney, Agent, or Firm*—W. H. MacAllister, Jr.; Martin E. Gerry

[57] ABSTRACT

In a radar PPI display, the cathode-ray tube beam is intensified during a selected sweep in a predetermined pattern to generate an identifying pattern of line segments or dots on the sweep. The pattern is controlled by a range counter used to generate the sweep. Upon scaling the range, the clock pulse rate to the range counter is changed, thereby permitting the same stage, or stages, of the range counter to control intensification of the range sweep.

13 Claims, 7 Drawing Figures

Minimum Range Scale PPI Display

Fig. 6.

Maximum Range Scale PPI Display

Fig. 7.

DIGITAL LINE GRAPHICS CONTROL ON RANGE SCALABLE RADAR CRT DISPLAY

The invention herein described was made in the course of or under a contract or sub-contract thereunder with the Air Force.

BACKGROUND OF THE INVENTION

This invention relates to cathode-ray-tube (CRT) radar displays, and more particularly to radar display utilizing digital deflection techniques.

Real-time radar systems have a variety of data to display. Much of the data can be displayed by graphic lines of full range length, such as a reference azimuth with respect to the radar, or of some shorter length, such as a dot for each azimuth sweep at a reference point for the scale selected.

Antenna azimuth can be continually and automatically read into the display system to control a PPI display as the radar system continues to sweep. To produce a reference azimuth, such as to indicate heading, it is then a simple matter to compare the antenna azimuth with the heading. When the antenna azimuth is equal to the heading, the beam intensity is increased to a predetermined level to brighten the next sweep trace. In addition to, or instead of brightening the trace, it is desirable to provide some identification of the reference azimuth in a manner least confusing to the operator, and with a minimum of hardware beyond that required to display real time radar sweeps.

In the past, identification of a reference azimuth has been provided by displaying the radar sweep for that azimuth as a broken line, such as a dashed line comprised of line segments of equal length separated by blank spaces of equal length. This could be easily accomplished by sensing the outputs of selected stages of a range counter, and effectively decoding those outputs to control blanking of the CRT beam during the appropriate range intervals. This identification would, however, result in a change in the lengths of the line segments, and the blank spaces between line segments, with each change in scale. For example, upon doubling the range, the line segments would be doubled in length. To compensate for that, the outputs to the decoder from the range counter (which always counted at a constant clock frequency) were switched to one lower order. Such a switching technique will maintain the length of line segments spaces constant for each range scale selected, but involves rather complex and cumbersome hardware.

The problem of displaying a dot for each azimuth sweep at half the range is the same. A dot is but a special case of a line segment display. For the minimum range scale, a range counter state can be detected which is just half the maximum count. The sweep trace can then be brightened for a short interval to display the dot. That can be selected to occur on every radar sweep. But if the range is halved, the dot will be displayed at twice the distance from the center (on the edge of the screen). To maintain it at half the radius of the screen, the range scale decoding logic must be switched to the stage or stages of the next lower order in this prior-art technique.

OBJECTS AND SUMMARY OF THE INVENTION

An object of this invention is to provide an improved technique for CRT radar display of a variety of data such that the position and size of identifying features of the displayed data will not change with any change in the selected range scale.

Still another object is to provide CRT display of radar data controlled by decoded outputs of a range counter used for counting clock pulses in developing a range sweep such that the position and identifying features of the displayed data will be maintained spatially constant with change in range scale, all without switching outputs of the range counter for decoding.

These and other objects of the invention are provided in a radar display system employing a cathode-ray tube and a counter for counting clock pulses to develop a range sweep. Outputs from fixed stages of the counter are decoded by means for determining the position or positions at which predetermined data is to be displayed during a given range sweep. For display of such predetermined data at only one specified sweep, the specified sweep is selected by decoding means for comparing display sweep positioning data and the specified sweep position data. For changing range scale without affecting the position and size of the identifying features of the predetermined data to be displayed, an appropriate faster clock for the clock counter is provided.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
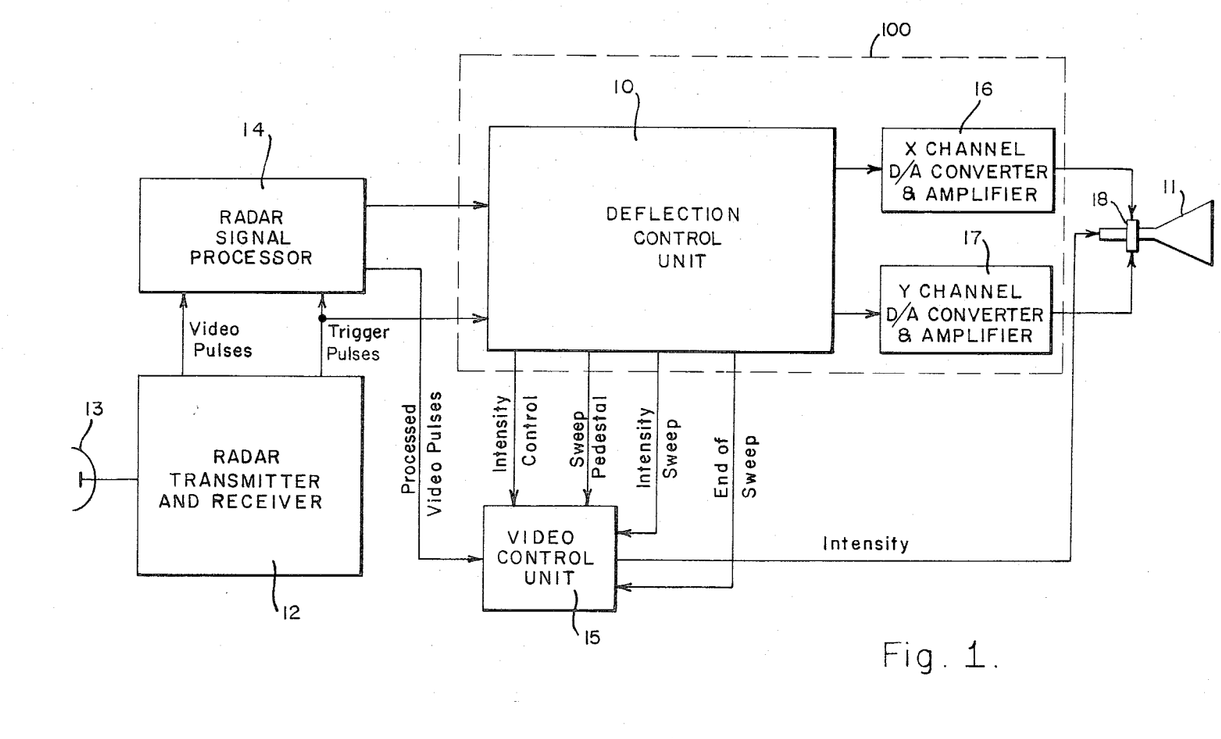
FIG. 1 illustrates in a block diagram an exemplary environment for the present invention.

Referring to FIG. 1, which shows a general block diagram of a radar system, the present invention relates to the novel manner in which a deflection unit 10 is implemented for displaying a reference azimuth on the face of a cathode-ray tube 11 during normal PPI radar display. A radar transmitter and receiver 12 transmits pulses through an antenna 13 at a fixed rate and after each pulse listens for a return signal for a specified period. A common antenna 13 is assumed for both transmitting and receiving radar pulses.

The pulse repitition frequency (PRF) of trigger pulses received by the transmitter from a radar signal processor is selected to allow for more than a sufficient time for listening between radar pulses. The radar signal processor 14 initiates timing for the radar sweep displays and receives video pulses from the receiver for display. The processor controls display of the video pulses in the usual manner, through the deflection unit 10 and a video control unit 15. Following the sweep generation period, the deflection unit is reset and made ready for the following sweep display. For the PPI sweep, the control outputs are X and Y coordinate values for the CRT in digital form. Two units 16 and 17 convert the respective X and Y coordinates to analog form, and amplify the analog signals to the level necessary for a deflection yoke 18 of the CRT. The video control unit 15 blanks the CRT beam while the transition from one sweep to another takes place, and otherwise controls intensity of the beam during the normal PPI display mode in the usual manner.

Deflection control unit 10, X channel D/A converter and amplifier 16 and Y channel converter and amplifier 17 comprise the X and Y deflection system 100 of this display.

Figure 2:
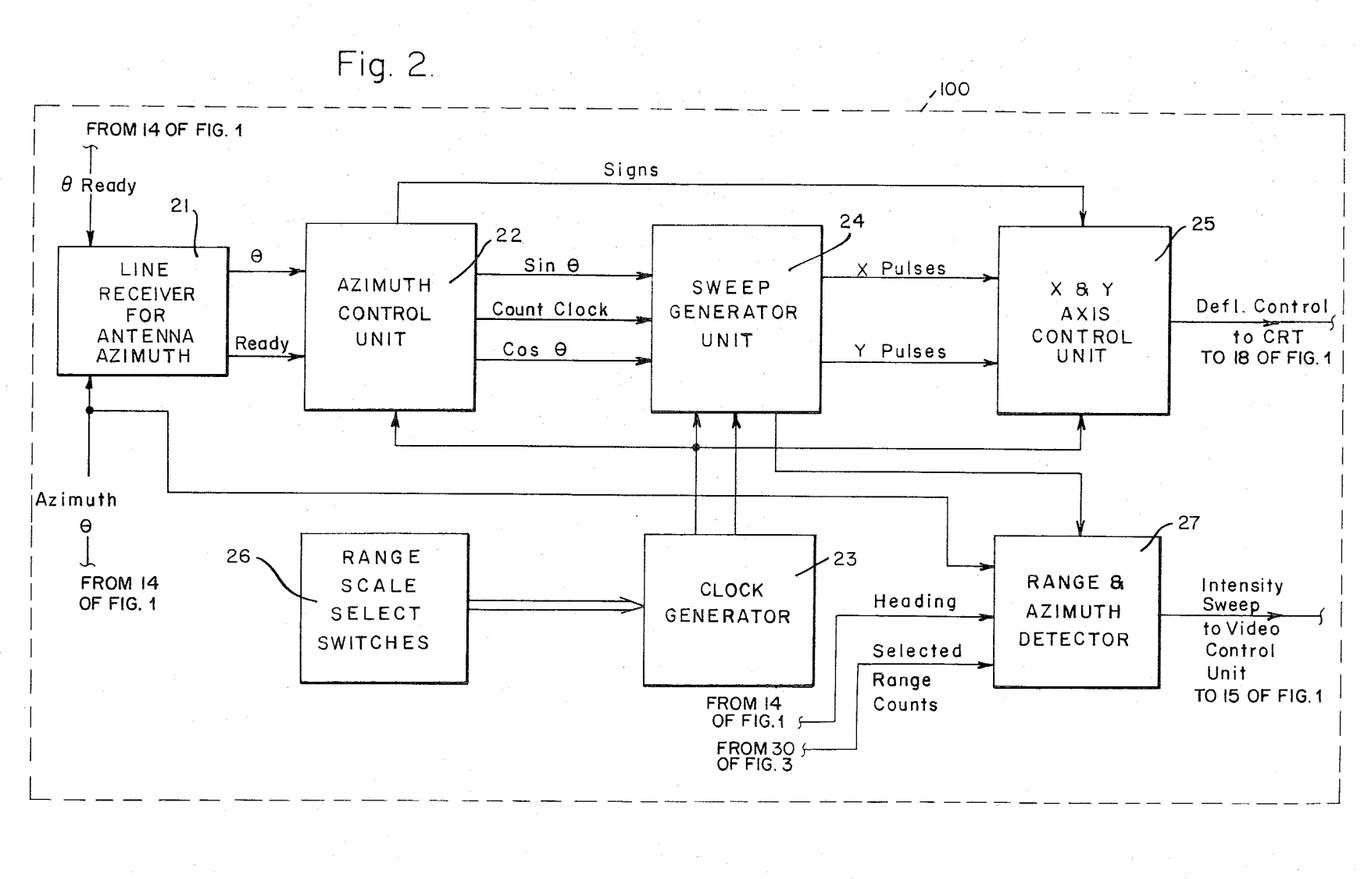
FIG. 2 illustrates in a block diagram a general implementation of the deflection unit of FIG. 1.

Before proceeding with a description of the invention, a more detailed description of the organization and function of the deflection unit 10 will be given with reference to FIG. 2. FIG. 2 comprises basically deflection system 100, which when broken down to its component parts comprises line receiver for antenna azimuth 21, azimuth control unit 22, sweep generator 24, X and Y axis control unit 25, range scale select switches 26, clock generator 23 and range and azimuth detector 27. Line receiver 21 continually receives azimuth data in digital form from the radar signal processor 14 (FIG. 1) for use in an azimuth control unit 22. Also received from the radar signal processor is a READY signal when the azimuth data to the receiver is stable.

A clock generator 23 consisting of sweep pedestal flip-flop FF1, sweep clock counter Q11 – Q18, NAND gates 42 – 49, and OR gate 41, provides a stable frequency reference for sweep and system clocks. A 20.7205 MHz crystal controlled oscillator 101 is used to generate a clock pulse train which clocks an eight-bit sweep clock counter and a five-bit system clock counter. The sweep clock counter is used to derive the following frequencies:

TABLE I

| SWEEP COUNTER OUTPUTS | RANGE SCALE SELECTION (Nautical Miles) |
|---|---|
| 5.18 MHz | 8 mile |
| 2.59 MHz | 16 mile |
| 1.295 MHz | 32 mile |
| 647.515 KHz | 64 mile |
| 323.757 KHz | 128 mile |
| 161.898 KHz | 256 mile |
| 80.939 KHz | 512 mile |

Figure 3:
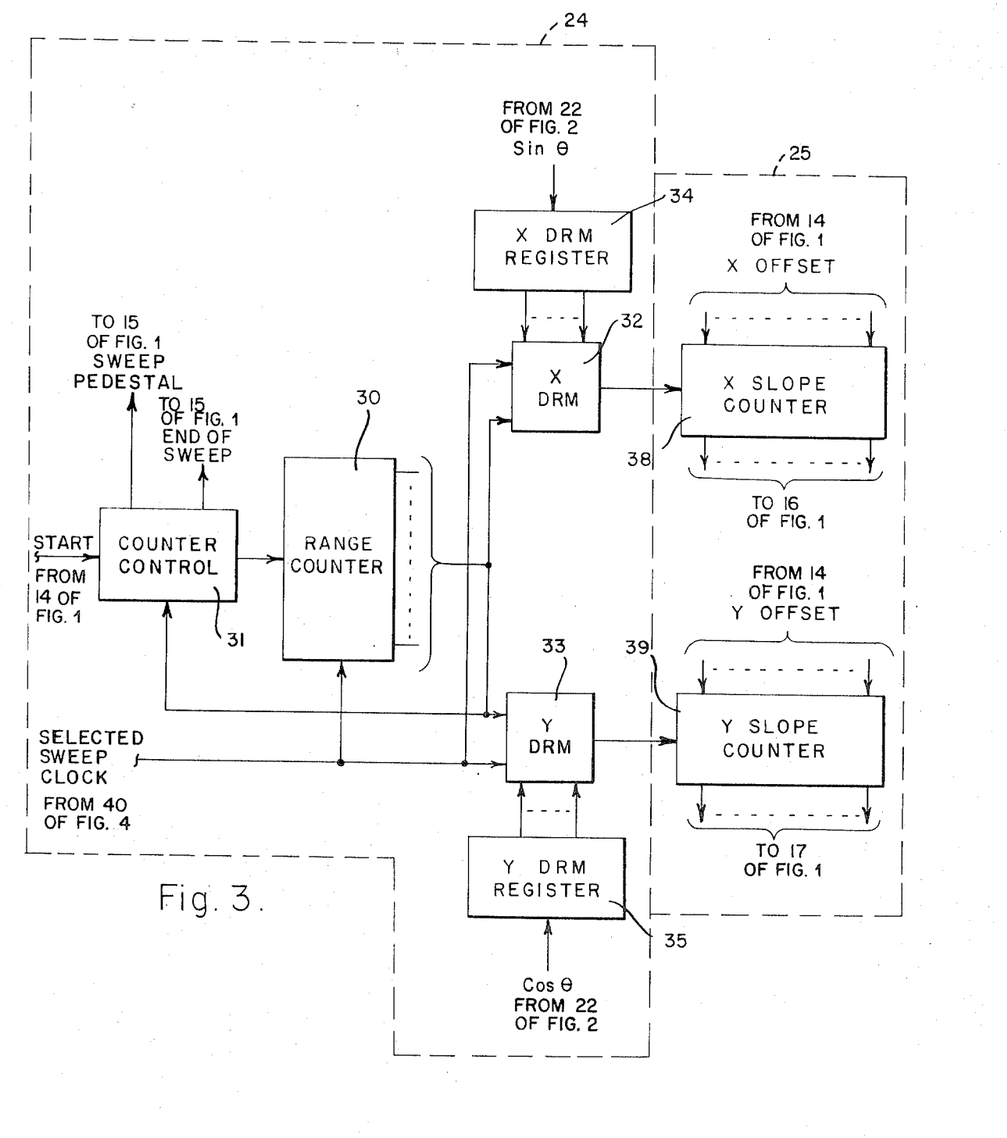
FIG. 3 illustrates in a block diagram a preferred embodiment of the sweep generator unit of FIG. 2 in accordance with the present invention.

As will be described more fully hereinafter with reference to FIG. 3, the sweep counter outputs are gated out with range select switches 26, consisting of switches $S_1$ through $S_7$, selectively activated to enable one of a bank of NAND gates. In that manner the sweep clock output is a pulse train whose frequency is selected as a function of range scale according to the foregoing table. The system clock counter is used to derive a system clock at 647.515 KHz from the 20.7205 MHz clock.

The azimuth control unit 22 receives in digital form antenna azimuth $\theta$ from the line receiver 21 and converts the received azimuth value to sine $\theta$ and cosine $\theta$ values (in digital form) for use by X and Y digital rate multipliers in the sweep generator unit 24. Count direction is also included in the converted azimuth value as a sign bit for use in an X and Y axis control unit 25. Sweep generator unit 24 comprises counter control means 31, range counter 30, X DRM register 34, X DRM means 32, Y DRM register 35 and Y DRM means 33. X and Y axis control unit 25 comprises X and Y slope counter units 38 and 39 respectively.

The azimuth control unit 22 consists of a storage register for the azimuth value to be converted and a read-only memory which uses the azimuth value to address a look-up table and read out the sine and cosine values. It also includes a network to decode the azimuth value into proper signs for the sine and cosine multiplication required to obtain the X and Y pulse trains from the line generator unit. Loading of the storage register with antenna azimuth is controlled during radar dead time, i.e., immediately upon the conclusion of radar ranging time. When the READY signal is true, the antenna azimuth is sampled and stored. This assures receipt of valid data on the input lines. Each sweep azimuth value is retained throughout the following radar sweep time. Near the end of that time, a line azimuth is loaded into the register for use in graphic display during radar dead time.

Figure 7:
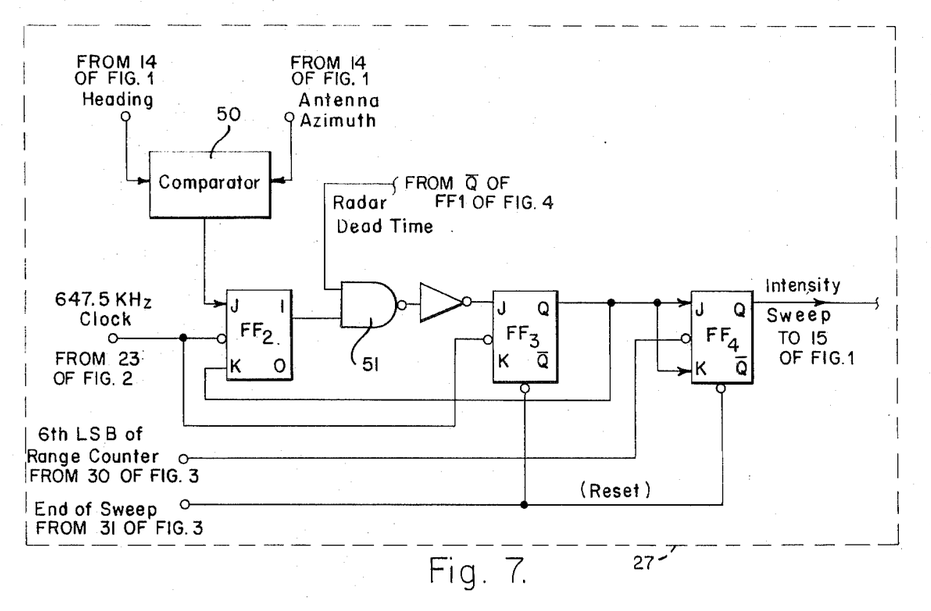
FIG. 7 is a logic diagram of a network for producing the line segment and space characteristics of the reference line shown in FIGS. 5 and 6.

A range and azimuth detector 27, comprising comparator 50, flip-flop $FF_2$, NAND gate 51, flip-flop $FF_3$ and flip-flop $FF_4$, receives a reference azimuth selected to be marked by intensifying the radar sweep at predetermined range counts of the sweep, is illustrated in FIG. 7 and explained in greater detail hereinbelow. For illustration, the reference azimuth is shown to be HEADING, but may be any azimuth arbitrarily selected as by an operator at a control panel. The selected range counts could also be designated by the operator, but for marking the heading, a predetermined range count is assumed which will divide the range sweep into eight segments alternate ones of which are intensified.

What has been described with reference to FIGS. 1 and 2 has been the environment of the present invention in general terms. Other equivalent environments may use the present invention to equal advantage. The sweep generator unit 24 will now be described with reference to FIG. 3.

The sweep generator unit 24 is comprised of four basic parts: a 16-bit range counter 30 and counter control 31; X and Y digital rate multipliers (DRM), 32 and 33; and associated X and Y DRM registers, 34 and 35. During radar sweep time, the maximum sweep range count is entered into the sweep range counter as a function of the range selected for display and maximum offset of 512 miles according to the following table:

TABLE II

| Selected range | MSB | | | ... Counter stages ... | | | | | | | | | | | LSB | Maximum count |
|---|---|---|---|---|---|---|---|---|---|---|---|---|---|---|---|---|
| 512 | 0 | 0 | 0 | 0 | 0 | 0 | 1 | 0 | 0 | 0 | 0 | 0 | 0 | 0 | 0 | 512 |
| 256 | 0 | 0 | 0 | 0 | 0 | 1 | 0 | 0 | 0 | 0 | 0 | 0 | 0 | 0 | 0 | 1,024 |
| 128 | 0 | 0 | 0 | 0 | 1 | 0 | 0 | 0 | 0 | 0 | 0 | 0 | 0 | 0 | 0 | 2,048 |
| 64 | 0 | 0 | 0 | 1 | 0 | 0 | 0 | 0 | 0 | 0 | 0 | 0 | 0 | 0 | 0 | 4,096 |
| 32 | 0 | 0 | 1 | 0 | 0 | 0 | 0 | 0 | 0 | 0 | 0 | 0 | 0 | 0 | 0 | 8,192 |
| 16 | 0 | 1 | 0 | 0 | 0 | 0 | 0 | 0 | 0 | 0 | 0 | 0 | 0 | 0 | 0 | 16,384 |
| 8 | 1 | 0 | 0 | 0 | 0 | 0 | 0 | 0 | 0 | 0 | 0 | 0 | 0 | 0 | 0 | 32,768 |

The maximum count indicated is the number of clock pulses counted down from the binary number shown for the counter stages to zero. The clock pulses are received from the clock generator 23 (FIG. 2) at the rate specified by Table I. A count down to zero is detected, such as by the counter control unit 31, to enable an END OF SWEEP signal to be sent to the video control unit 15 to blank the CRT until the next display operation, which may be a graphic line display during the dead time period, or another sweep during the next radar sweep period.

During each sweep, a delayed SWEEP PEDESTAL is generated of seven clocks to produce a blank area at the sweep center. This area is constant for all range scales, for reasons that will be evident due to the present invention, and prevents burning of the CRT phosphor at the sweep center.

Each time the range counter is loaded, Cartesian (X and Y) coordinates for the sweep origin are loaded into X and Y slope counters as OFFSET data. In the usual case, both slope counters are loaded with zeros so that the sweep begins at the screen center, but when the sweep center is to be offset, the slope counters are preloaded with the X and Y OFFSET data in the usual manner (which does not in any way affect the present invention). Thus, prior to a sweep START command to the counter control unit, initial X and Y values are stored in the slope counters. As the sweep progresses, the counters count up or down as directed by count direction control signals from the azimuth control unit according to the signs of the sine and cosine values entered into the DRM registers 34 and 35. For a sweep azimuth angle $\theta$ in the first quadrant (0° to 90°), both count up; in the second quadrant (90° to 180°), the Y slope counter counts down; in the third quadrant (180° to 270°), both count down; and in the fourth quadrant (270° to 360°), the X slope counter counts down. In each case, the count is at the rate of X and Y pulse trains from the respective digital rate multipliers 32 and 33, and in each case, the rate is determined by the rate at which the range counter receives selected sweep clock pulses from the clock generator 23 (FIG. 2). The sweep clock is selected as a function of range scale in accordance with the present invention. Thus, when the range scale is changed, the sweep clock is changed. The selection of the proper sweep clock frequency is as a function of range scale and real time propagation of radar energy.

Figure 4:
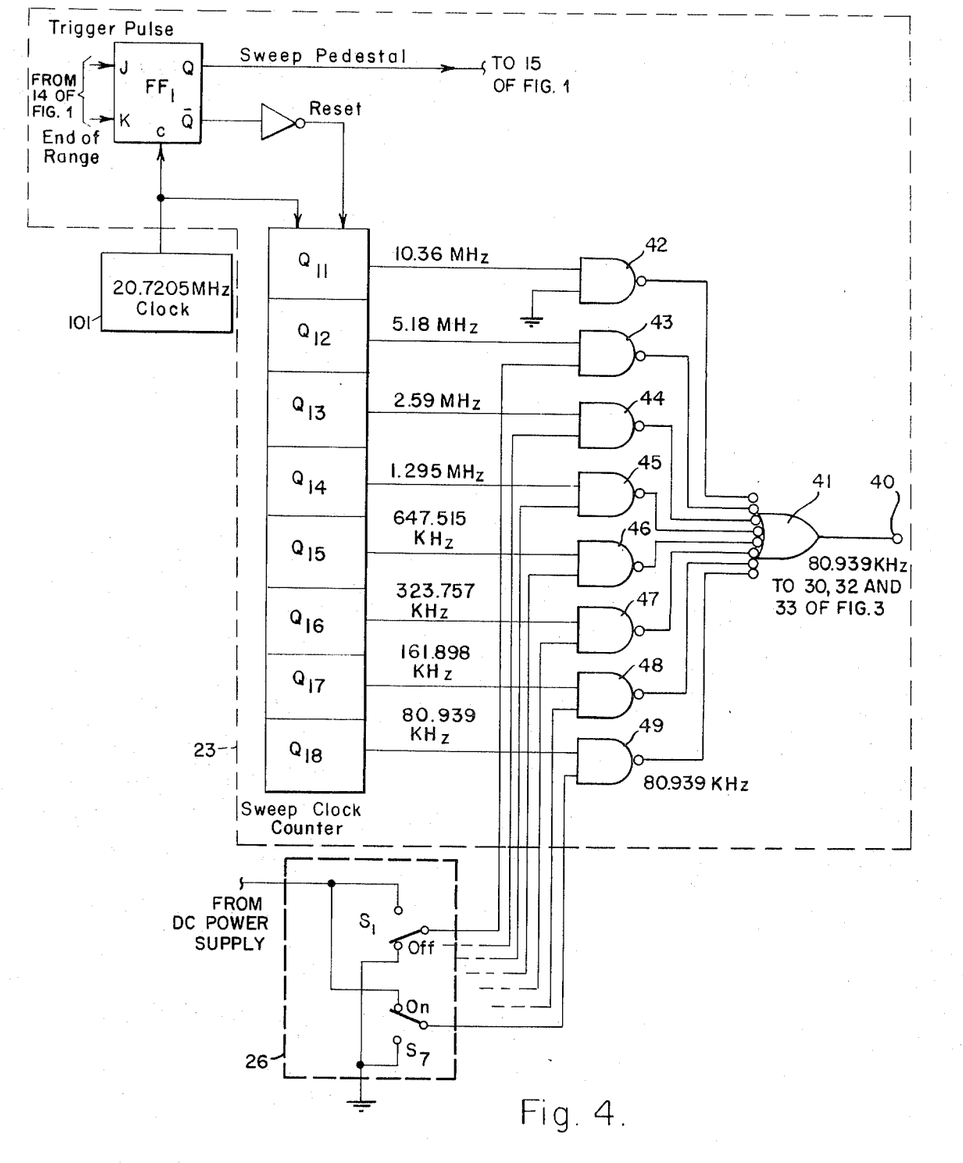
FIG. 4 illustrates diagrammatically a preferred implementation of a clock generator for use in the present invention.

An exemplary implementation of the clock generator 23 which permits selection of the sweep clock frequency as a function of range scale is illustrated in FIG. 4. A sweep pedestal flip-flop $FF_1$ is set true by the trigger pulse which initiates a radar sweep and the next 20.7205 MHz clock. This enables the eight-bit sweep counter $Q_{11}$ to $Q_{18}$ to count until an end-of-range signal is received from the sweep generator unit 24 (FIG. 2). That signal resets the sweep pedestal flip-flop $FF_1$ which in turn resets and disables the sweep clock counter.

The "true" outputs of the sweep counter stages $Q_{11}$ to $Q_{18}$ are coupled to an output terminal 40 by an "or" gate 41 via a bank of "and" gates 42 to 49. Each "and" gate has its second (control) terminal connected to ground through separate switches $S_1$ to $S_7$ (or the equivalent) to block the transmission of sweep clock pulses to the output terminal 40. That terminal is connected to the clock input terminal of the range counter 30 (FIG. 3). Upon selecting a range, one of the switches $S_1$ to $S_7$ will connect the control terminal of the appropriate selecting gate to +V to allow clock pulses to be transmitted at the appropriate frequency for the range scale selected.

The highest frequency of 10.36 MHz for the 4 mile range scale is not used in the present embodiment. Accordingly the control terminal of the "and" gate 42 is connected permanently to circuit ground rather than to a switch-like switch $S_1$. The respective switches $S_1$, to $S_7$ are switched to their up (+V) positions for the successively greater range scales of eight miles to 512 miles. In practice the switches $S_1$ to $S_7$ are "ganged" such that the selected gate is connected to +V at all times while all others are connected to circuit ground.

Selecting the sweep frequency for the range scale desired automatically scales the range sweep. For the maximum range of 512 miles, the smallest number preloaded into the range counter is counted down at the lowest sweep clock rate of 80.939 KHz. If the range is halved to 256 miles, the sweep must reach the edge of the screen in half the time interval required for the maximum range scale sweep. One way to accomplish this is count the range counter at the minimum range selection clock frequency and switch in one LSB per range selection increase at the slope counters, and thereby decrease the count rate of the slope counters by a factor of two. That is the way in which it was done in the past, as noted hereinbefore.

In accordance with the present invention, the LSB's of the slope counters are maintained constant, and the sweep is caused to reach the edge of the screen in twice the time interval required for the minimum range scale by selecting the next lower sweep clock frequency, namely 2.59 MHz. This has the effect of maintaining all reference displays as opposed to video data, controlled by the range counter constant in respect to unit length per sweep pulse counted. In that manner, changing the range scale by a factor of $2^n$ down and up, where n is a whole integer, is accomplished by switching the sweep clock frequency up and down, respectively, by a factor of $2^n$. For example, to change the range scale from 512 miles to 64 miles, the integer $n$ is equal to 3 and the sweep clock frequency is increased by $2^3 = 8$ to 647.515 KHz.

To better understand this concept of increasing range selection by decreasing sweep clock frequency, and vice versa, it should be recalled that the data being displayed on a sweep are radar pulse returns which travel at a constant speed (round trip energy propagation requires approximately 12.35 $\mu$sec per nautical mile). If only eight miles are to be displayed, the display radius must be reached in 8×12.35 $\mu$sec. When range is increased to 16 miles, the display radius must be reached in 16×12.35 $\mu$sec. Doubling the rate of clock pulses to be counted by the range counter results in a fixed number of pulses being effectively generated as the multiplicand for the pulse rate multipliers. Accordingly, the slope counters receive the same number of pulses to complete the sweep at all range scales, but in twice the time for twice the range scale to permit radar returns from twice the range to be received and displayed.

The range counter 30 also has the outputs of all of its stages connected to the range azimuth detector 27 (FIG. 2) to intensify the radar sweep on the CRT screen as appropriate to intensify segments of the heading sweep. The antenna azimuth is also applied to the detector in digital form. When the antenna azimuth is equal to the heading, a signal is generated to enable the INTENSIFY SWEEP signal to be transmitted to the video control unit. There that signal is added to the intensity control signal, as illustrated in FIGS. 5 and 6 to intensify the sweep being displayed.

Binary counter 23 has at least n cascaded stages, where n is the number of range scales from which selection is made; and the n range scales are from $2°m$ miles through $2^{n-1}m$ miles, a source of clock pulses 101 at a fixed frequency counted by said binary counter $Q_{11}$ – $Q_{18}$, and means 42 – 49 for selectively gating out from the successive stages 1 through $n$ for the respective range scales $2°m$ through $2^{n-1}m$ miles as selected. The number stored in the range counting means 24 is selected to be $2^{p-o}$ through $2^{p-(n-1)}$ for respective range scales $2°m$ through $2^{n-1}m$, where $p$ is an arbitrary whole integer selected to yield a maximum count for the greatest range scale that produces the minimum resolution desired in the range sweep. The range counting means may have entered therein the maximum sweep range count of the range selected for display wherein the integer $p$ is selected to yield a maximum count of $2^{n-1}m$ for the maximum range of $2^{n-1}m$.

Figure 5:
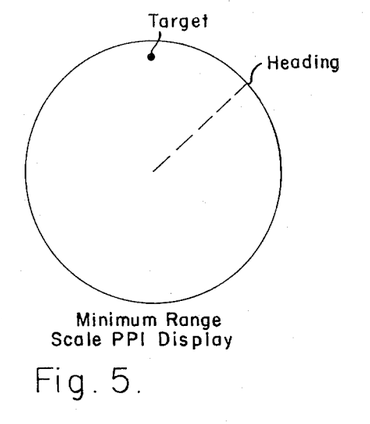
FIGS. 5 and 6 are illustrations of a reference line display at minimum and maximum range scales.
Figure 6:
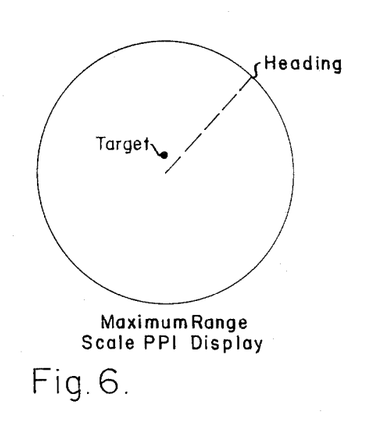

A target appears on the PPI display shown in FIG. 5 near the edge of the screen. To bring that target in toward the center, such as to look for other targets near the one shown, the range scale may be selectively increased. If increased to the maximum of 512 miles shown in FIG. 6, it will appear at the same azimuth but closer to the center. The reference azimuth will also appear in the same place, since only range has been changed but with the same characteristic, namely line segments of the same length spaced as before. This is so because, although the display range is increased, the same range counter output stage is sensed by the range-azimuth detector such that the line segments, and spaces between segments, are produced independent of range scale.

This can be better understood when one considers that the range is changed by simply changing the frequency of the sweep clock pulses applied to the range counter so that more screen is covered per unit time at a lower range scale, i.e., upon decrementing from maximum range to half range, for example. The radar propagation of energy remains at a constant speed. Consequently, as the CRT sweep is increased in speed by increasing the sweep clock frequency, a target fixed in space will appear on the CRT further from the screen center. The identifying characteristics of the reference azimuth are produced by the sampled stage of the range counter which bear a fixed relation to space on the screen and are independent of range, i.e., are not in any way dependent on real time.

FIG. 7 illustrates a range azimuth detector for the dashed line of FIGS. 5 and 6. When the antenna azimuth is equal to the heading, a comparator 50 transmits a signal. The next system clock sets a flip-flop $FF_2$. A "dead time" signal from the azimuth control unit 22 (FIG. 2) is gated through a gate 51 to set a flip-flop $FF_3$ on the next system clock. In that manner, the reference azimuth is not intensified until the next full sweep commences, even though the comparator 50 may transmit a signal during a sweep. The true output of the flip-flop $FF_3$ enables a flip-flop $FF_4$ to be toggled by the sixth stage of the range counter until an "end of sweep" signal resets both flip-flop $FF_3$ and $FF_4$. The output of the flip-flop is used to control the intensity of the CRT beam through the video control unit 18 (FIG. 1). While the flip-flop $FF_4$ is set, the beam is intensified, but only while not otherwise blanked.

This illustrative implementation of logic for providing identifying characteristics for a selected azimuth sweep is intended to be exemplary, and not to be a limitation on the present invention. Many other display patterns can be generated by selecting various other ones of the range counter outputs. What is important is only that the range counter can be used to time the intensity control signal. The resulting line or dot pattern will then appear substantially the same on the screen for any selected range scale, i.e., without lengthening or shortening the line segment or dot lengths. Range switching is thus a simple matter of switching sweep clocks from the clock generator 23 (FIG. 2).

Although particular embodiments of the invention have been described and illustrated herein, it is recognized that modifications and variations may readily occur to those skilled in the art. It is therefore intended that the claims be interpreted to cover such modifications and variations.

What is claimed is:

1. In a cathode-ray tube display system having digital means for deflection of an electron beam in said tube, said digital deflection means including a deflection control unit for storing a number inversely proportional to the range of a radar sweep to be displayed and range counting means for counting a number of clock pulses equal to said stored number to control said deflection means in displaying a radar sweep, an improvement comprised of means for selecting the frequency of said clock pulses to be inversely proportional to said range and directly proportional to said number, thereby causing the displayed range to be a function of range scale, range and azimuth detecting means for detecting predetermined counts of clock pulses in said range counting means, and means for intensifying said electron beam during said predetermined counts, thereby intensifying said radar sweep displayed along one or more predetermined segments of the same lengths and positions for any range scale selected through coordinated selection of the number stored in said range counting means and selection of said clock pulse frequency.

2. Apparatus as defined in claim 1 wherein said clock frequencies are generated by a binary counter having at least n cascaded stages, where $n$ is the number of range scales from which selection is made, and the n range scales are from $2°m$ miles through $2^{n-1}m$ miles, a source of clock pulses at a fixed frequency counted by said binary counter, and means for selectively gating out from the successive stages 1 through n for the respective range scales $2°m$ through $2^{n-1}m$ miles as selected.

3. Apparatus as defined in claim 2 wherein said range counting means is a binary counter and said number stored in said range counting means is selected to be $2^{p-o}$ through $2^{p-(n-1)}$ for respective range scales $2°m$ through $2^{n-1}m$, where $p$ is an arbitrary whole integer selected to yield a maximum count for the greatest range scale that produces the minimum resolution desired in said range sweep.

4. Apparatus as defined in claim 3 wherein said range counting means is a sweep range counter into which is entered the maximum sweep range count of the range selected for display, and wherein said integer p is selected to yield a maximum count of $2^{n-1}m$ for the maximum range of $2^{n-1}m$.

5. Apparatus as defined in claim 3 wherein said range counting means is a binary count down counter having $p$ stages and is preset for the respective $2^0m$ through $2^{n-1}m$ range scales by entering a binary digit 1 in the most significant pth stage for the maximum range scale of $2^{n-1}m$ and in successively lower stages for the successively lower range scales.

6. Apparatus as defined in claim 5 including means for selecting range sweeps to be intensified by said intensifying means, and means responsive to said radar sweep selecting means for inhibiting said intensifying means during all range sweep displays except the range sweeps selected.

7. In a radar cathode-ray tube display system having $x$- and $y$-axis deflection systems, and having a selectable range scale for all radar video data, apparatus for display of a reference line segment or spaced segments during a predetermined radar range sweep without alteration in segment length, or alteration in spacing between segments, as a function of radar range selection, said apparatus comprised of:
  means for providing clock pulses at a plurality of different frequencies for different radar ranges to be selected;
  means for selecting an appropriate one of said clock pulse frequencies for a desired radar range;
  digital range counting means having a number of stages for counting clock pulses at the frequency selected for timing a sweep of a cathode-ray tube beam for the range selected;
  means for detecting when said predetermined radar sweep is to take place next; and
  intensifying means responsive to said last named means and to at least one of said stages of said digital range counting means selected for intensifying said beam during said sweep for at least one segment of said sweep, where the segment intensification is determined by the stage or stages selected from said counter, whereby segment intensification occurs for the same segment length or lengths with constant spacing for any radar scale selected.

8. Apparatus as defined in claim 7 wherein said range counting means is a count-down counter preset for each range sweep to a number inversely proportional to the range of a range sweep to be displayed as selected for a desired range scale.

9. Apparatus as defined in claim 8 wherein said clock pulse frequencies are generated by a binary counter having at least $n$ cascaded stages, where $n$ is the number of range scales from which selection is made, and the n range scales are from $2^0m$ miles through $2^{n-1}m$ miles, a source of clock pulses at a fixed frequency counted by said binary counter, and means for selectively gating out from the successive stages 1 through $n$ for the respective range scales $2^0m$ through $2^{n-1}m$ miles as selected.

10. Apparatus as defined in claim 9 wherein said range counting means is a binary counter and said number stored in said range counting means is selected to be $2^{p-0}$ through $2^{p-(n-1)}$ for respective range scales $2^0m$ through $2^{n-1}m$, where $p$ is an arbitrary whole integer selected to yield a maximum count for the greatest range scale that produces the minimum resolution desired in said range sweep.

11. Apparatus as defined in claim 10 wherein said range counting means is a sweep range counter into which is entered the maximum sweep range count of the range selected for display, and wherein said integer $p$ is selected to yield a maximum count of $2^{n-1}m$ for the maximum range of $2^{n-1}m$.

12. Apparatus as defined in claim 11 including means for selecting range sweeps to be intensified by said intensifying means, and means responsive to said radar sweep selecting means for inhibiting said intensifying means during all range sweep displays except the range sweeps selected.

13. Apparatus as stated in claim 7, wherein means for detecting when said predetermined radar sweep is to take place next, comprises in combination:
  a comparator for comparing azimuth with heading;
  a first flip-flop circuit responsive to output from the comparator and to the means for providing clock pulses;
  a gate responsive to output from the first flip-flop circuit and to the means for providing clock pulses for providing setting capability for the next of the clock pulses; and
  a second and third flip-flop circuit, the second circuit being responsive to output of the gate and to the means for providing clock pulses for enabling the third circuit, and the third circuit being responsive to the second circuit for controlling intensity of the sweep.

* * * * *

UNITED STATES PATENT OFFICE
CERTIFICATE OF CORRECTION

PATENT NO. : 3,789,403
DATED : January 29, 1974
INVENTOR(S) : Rudolph Dalena, Roy K. Onishi and Donald F. Walker It is certified that error appears in the above-identified patent and that said Letters Patent are hereby corrected as shown below:

Column 10, Line 5, Claim 9: "2 m" should read $--2^{n-1}m--$.

Column 10, Line 11, Claim 10: delete "$n-1$".

$\mathfrak{Signed}$ and $\mathfrak{Sealed}$ this

Twenty-first $\mathfrak{Day}$ of September 1976

[SEAL]

*Attest:*

RUTH C. MASON
*Attesting Officer*

C. MARSHALL DANN
*Commissioner of Patents and Trademarks*